(12) United States Patent
Eto

(10) Patent No.: US 6,862,150 B1
(45) Date of Patent: Mar. 1, 2005

(54) INFORMATION STORAGE DEVICE AND DEFECT INFORMATION MANAGEMENT METHOD

(75) Inventor: Hiroaki Eto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/551,220

(22) Filed: Apr. 17, 2000

(30) Foreign Application Priority Data

Jul. 6, 1999 (JP) .......................................... 11-192312

(51) Int. Cl.⁷ .............................................. G11B 5/09
(52) U.S. Cl. ........................................ 360/53; 360/31
(58) Field of Search .............................. 360/53, 31, 25, 360/48, 54

(56) References Cited

U.S. PATENT DOCUMENTS

| | | | | | |
|---|---|---|---|---|---|
| 4,774,700 A | * | 9/1988 | Satoh et al. | ............. | 369/47.14 |
| 5,822,142 A | * | 10/1998 | Hicken | ......................... | 360/53 |
| 6,025,966 A | * | 2/2000 | Nemazie et al. | ............. | 360/53 |
| 6,043,945 A | * | 3/2000 | Tsuboi et al. | ................. | 360/47 |
| 6,098,185 A | * | 8/2000 | Wilson | ......................... | 360/25 |
| 6,181,500 B1 | * | 1/2001 | Serrano et al. | ............... | 360/53 |
| 6,201,655 B1 | * | 3/2001 | Watanabe et al. | ............. | 360/48 |
| 6,301,679 B1 | * | 10/2001 | Tan | ............................. | 360/31 |
| 6,442,715 B1 | * | 8/2002 | Wilson | ....................... | 714/710 |

FOREIGN PATENT DOCUMENTS

JP          5282790       10/1993

* cited by examiner

*Primary Examiner*—Sinh Tran
*Assistant Examiner*—Varsha A. Kapadia
(74) *Attorney, Agent, or Firm*—Greer, Burns & Crain, Ltd.

(57) ABSTRACT

An information storage device which stores information in recording areas generated by dividing a track is provided, wherein servo information is configured, the information storage device including: a recording area setting part which divides a storage medium into predetermined recording areas; an error detecting part which detects an error in the servo information. When the error detecting part detects an error in the servo information, recording areas spanning from a recording area including the servo information having the error to a recording area including next servo information are replaced by other recording areas, wherein the servo error information is managed and recording area setting is restarted.

12 Claims, 12 Drawing Sheets

FIG. 10

| CYLINDER | HEAD | BYTE POSITION FROM INDEX | LENGTH OF DEFECT |
|---|---|---|---|
| Cyl. 1 | H. 1 | P. 1 | L. 1 |
| Cyl. 2 | H. 2 | P. 2 | L. 2 |
|  | ⋮ | ⋮ |  |
| Cyl. n | H. n | P. n | L. n |

FIG. 11

| CYLINDER | HEAD | SECTOR NUMBER |
|----------|------|---------------|
| Cyl. 1   | H. 1 | S. 1          |
| Cyl. 2   | H. 2 | S. 2          |
|          | ⋮    |               |
| Cyl. n   | H. n | S. n          |

INFORMATION STORAGE DEVICE AND DEFECT INFORMATION MANAGEMENT METHOD

BACKGROUND OF THE INVENTION

1. Field of the Invention

The present invention generally relates to an information storage device and a defect information management method. Specifically, the present invention relates to an information storage device and a defect information management method for managing defect information arising when formatting a storage medium.

In recent years and continuing, an information storage device such as a hard disk drive is becoming higher density as it becomes smaller and achieves a greater capacity. In order to store high-density information in a storage medium, format processing is necessary for dividing the tracks of the storage medium into parts of a predetermined number of bytes, which takes much time. Therefore, it is required to perform format processing effectively.

2. Description of the Related Art

FIG. 1 is a block diagram showing a conventional magnetic disk device. The conventional magnetic disk device 1 mainly includes a magnetic disk 2, a spindle motor 3, a magnetic head 4, a head arm 5, a VCM (voice coil motor) 6, rotation axes 7, 8, a driver 9, a micro control unit (MCU) 10, a flash ROM 11, a hard disk controller (HDC) 12, an interface circuit (I/F) 13, a buffer (DRAM) 14 and a read/write channel 15.

The magnetic disk 2 is held by the rotation axis 8 of the spindle motor 3 and is rotated in the direction of the arrow A by the spindle motor 3. The spindle motor 3 is connected to the MCU 10 via the driver 9 and is controlled by the MCU 10 such that the spindle motor 3 rotates at a constant speed. The magnetic head 4 is placed opposite to the magnetic disk 2.

The magnetic head 4 is electrically connected to the read/write channel 15. The read/write channel 15 provides a recording signal to the magnetic head 4 such that information is recorded by magnetizing the magnetic disk 2. The magnetic head 4 is mechanically connected to an end of the head arm 5.

Another end of the head arm 5 is connected to the VCM 6 via the rotation axis 7. The VCM 6 is controlled by the MCU 10 via the driver 9 such that the VCM 6 moves the head arm 5 in the radial direction of the magnetic disk 2, that is, in the direction of the arrow B. As a result, the magnetic head moves in the radial direction of the magnetic disk 2 such that it follows a desired track on the magnetic disk 2.

The driver 9 controls the spindle motor 3 and the VCM 6. The MCU 10 performs format processing for dividing each track of the disk into recording areas of a predetermined byte length. The flash ROM 11 stores processing information for the MCU 10.

The HDC 12 controls the magnetic disk 2 based on information from the interface. The interface circuit 13 is connected to the HDC 12 which captures information from the interface 13. The buffer 14 temporarily stores information such as processing results.

The magnetic disk 2 is formatted according to a predetermined format for writing/reading information. The format processing for the magnetic disk 2 will be described below.

FIG. 2 shows a format of the magnetic disk according to a conventional technique. As preprocessing, a plurality of servo information 16 is configured on the magnetic disk 2 radially from the rotation axis 8 of the spindle motor 3. The servo information 16 includes information by which the magnetic head 4 follows the track 18 of the magnetic disk properly. The track 18 is configured concentrically around the rotation axis 8 of the spindle motor 3 and stores data. Data is stored in a sector which is a data area of a predetermined byte length along the track 18.

Next, processing is performed for detecting a defect part in the recording area 17 between consecutive sets of the servo information 16. The processing will be described.

FIG. 3 is a flowchart showing format processing and pre-processing according to a conventional technique. When performing this processing, the MCU 10 reads out a format processing procedure stored in the flash ROM 11.

In step S1, servo information 16 is written onto the magnetic disk 2. Next, in step S2, defect information is detected while following the track 18 according to servo information 16 for detecting a reading error between consecutive sets of servo information in the recording area. When a reading error is detected between consecutive sets of servo information, defect information which indicates the position of the error is temporarily stored in the buffer memory 14. The stored defect information is converted after format processing and stored in the flash ROM 11. When no error is detected, the processing is continued. After that, in step S3, so-called sectors are generated by dividing the recording area 17 into a plurality of predetermined intervals. In this processing, slip processing is performed when an error is detected between the consecutive sets of servo information, that is, in the sector. In the slip processing, information of the sector with the error is assigned to another sector.

In the format processing in step S3, when an error is detected in servo information, format processing in step 3 is aborted in the conventional technique. In the following, a track format in the above-mentioned formatting operation will be described with a figure.

FIG. 4 shows the track format at the time when defect information is detected according to a conventional example. FIG. 4 shows a servo error 20, format processing direction 30, normal servo information 40 and sectors 50. The recording area 17 is divided at regular intervals sequentially in the format processing direction 30 and addresses are provided. For example, the position of a track is determined from the servo information 40 such that the track is properly followed. After that, the recording area 17 is divided into sectors of a predetermined byte length. Addresses are provided to the sectors sequentially in the processing direction from the index which is a starting point of the track. For example, an address "100" is provided to a sector next to the servo information 40. Then, the sector is called sector 100. In the same way, addresses are provided to the sectors.

When the servo error 20 is detected while format processing, the sector 104 in which the servo error 20 exists becomes the address of the servo error. When a servo error is detected, a next sector can not be followed properly. Therefore, the format processing is aborted due to the servo error. As a result, the drive becomes inaccessible and the format processing needs to start from the beginning.

In the above-mentioned format processing, when a servo error is detected, the track can not be properly followed. Therefore, the format processing is aborted and the drive can not be accessed. Thus, the storage medium in which the servo error is detected can not be used and it is necessary to perform format processing from the beginning or to abandon the storage medium. Accordingly, the format processing can not be continued due to the servo error, which results in ineffectiveness of the format processing.

SUMMARY OF THE INVENTION

It is an object of the present invention to provide the information storage device and the defect information management method for performing format processing and using the storage medium effectively.

The above object of the present invention is achieved by an information storage device which stores information in recording areas generated by dividing a track, wherein track following information is configured such that a head follows the track according to the track following information, the information storage device including:

a recording area setting part which divides a storage medium into predetermined recording areas;

an error detecting part which detects an error in the track following information; and a control part which controls the information storage device, wherein, when the error detecting part detects an error in the track following information while setting recording areas using the recording area setting part, recording areas spanning from a recording area including the track following information having the error to a recording area including next track following information are replaced by other recording areas and the recording area setting is restarted.

According to the above mentioned invention, the information storage device has a format processing part and the error detecting part which detects an error in the track following information. By using the parts, the recording areas are replaced by slipping the recording areas, the slipped recording areas including a recording area having the defect part and recording areas between the defect part and the next track-following information. Thus, the format processing is restarted without interruption due to the error.

BRIEF DESCRIPTION OF THE DRAWINGS

Other objects, features and advantages of the present invention will become more apparent from the following detailed description when read in conjunction with the accompanying drawings, in which:

FIG. 10 shows a defect map according to the embodiment of the present invention;

FIG. 11 shows a primary list or a grown list according to the embodiment of the present invention;

DETAILED DESCRIPTION OF THE PREFERRED EMBODIMENTS

In the following, an embodiment of the present invention will be described.

Figure 1:
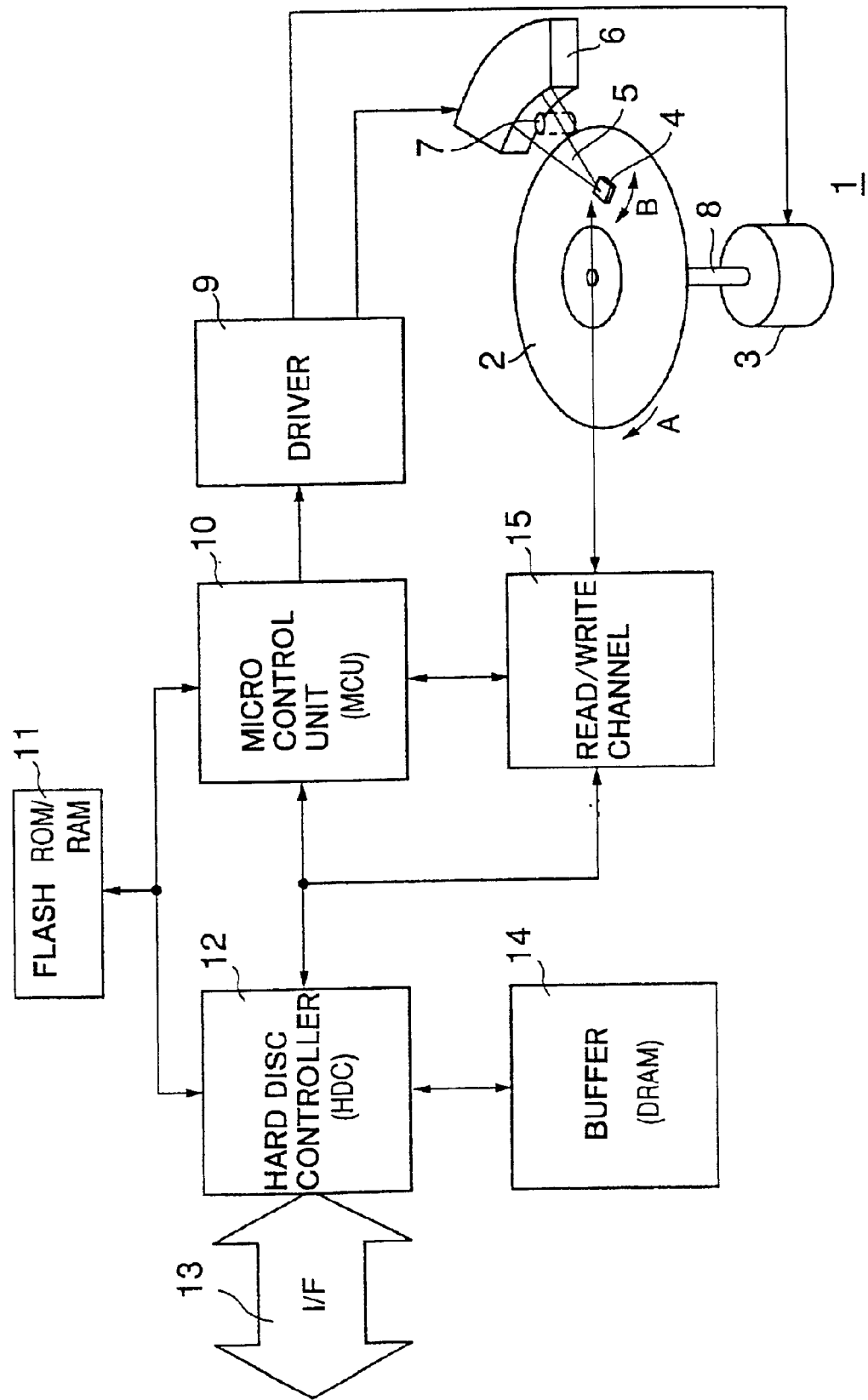
FIG. 1 is a block diagram showing a conventional magnetic disk device.
Figure 2:
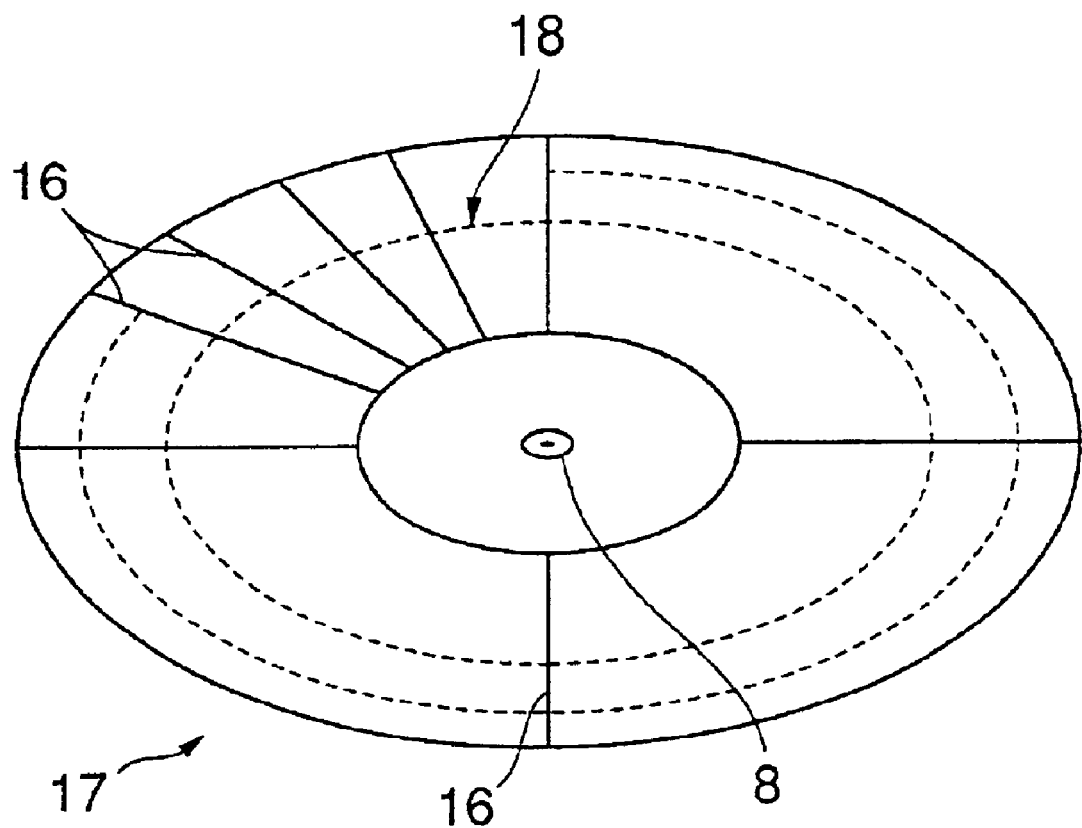
FIG. 2 shows a format of a magnetic disk according to a conventional technique.
Figure 3:
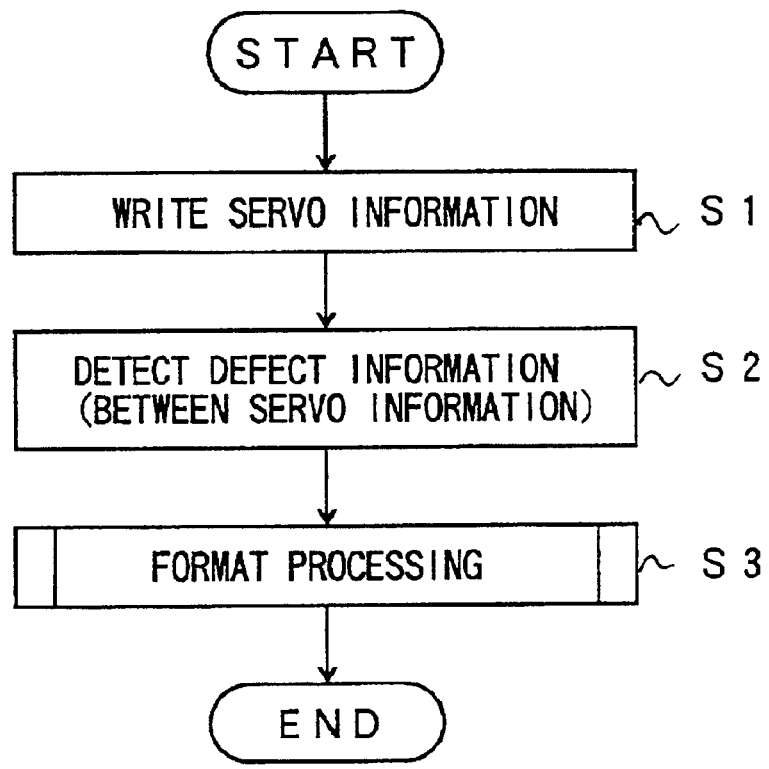
FIG. 3 is a flowchart showing format processing and pre-processing according to a conventional technique.
Figure 4:
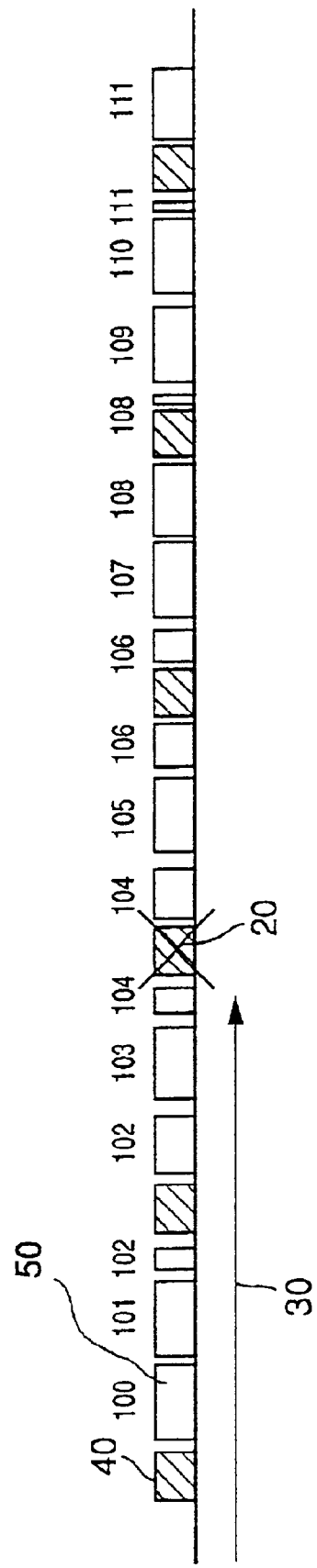
FIG. 4 shows a track format at the time when defect information is detected according to a conventional technique.

The configuration of a magnetic disk device of the embodiment of the present invention is the same as that shown in FIG. 1. The format processing is different from that of the conventional technique.

Figure 5:
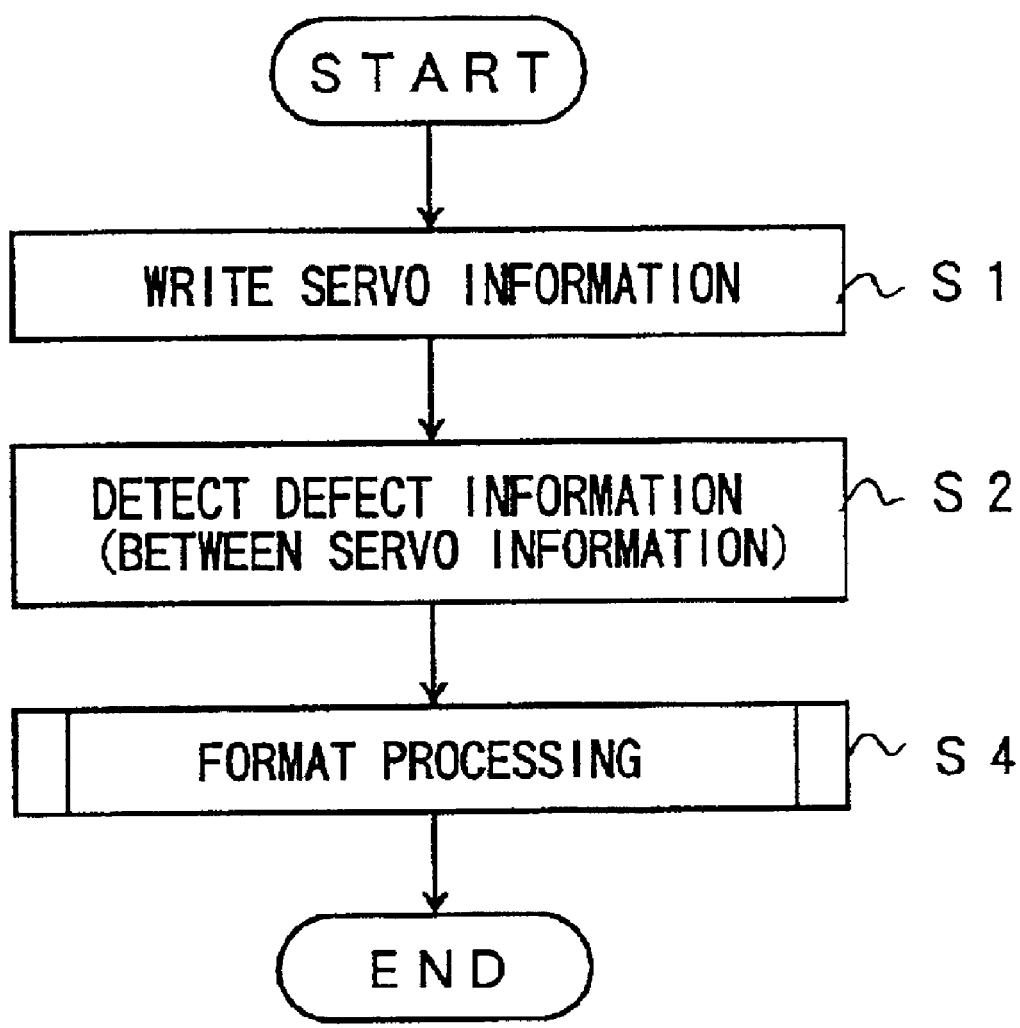
FIG. 5 is a flowchart showing format processing and pre-processing according to an embodiment of the present invention.

FIG. 5 is a flowchart showing format processing and pre-processing according to the embodiment of the present invention. In FIG. 5, when performing the processing, the MCU 10 reads out format processing procedure stored in the flash ROM 11.

In step S1, a plurality of sets of servo information 16 are written into the magnetic disk 2. Next, in step S2, predetermined information is written into or read out of a recording area between consecutive sets of servo information 16 while performing tracking control according to the servo information 16. The defect information is detected by finding an error. The defect information detected in step S2 is temporarily stored in the buffer memory 14. The stored error is converted for a new processing and stored in the flash ROM 11. When no error is detected, the processing is continued. After that, format processing is performed wherein the recording area 17 is divided at predetermined intervals and necessary information is written in step S4. At the time, the recording area is configured by avoiding the defect part by using the defect information detected in step S2. When an error is detected in servo information during format processing, slip processing is performed.

The format processing in step S4 will be described with a flowchart.

Figure 6:
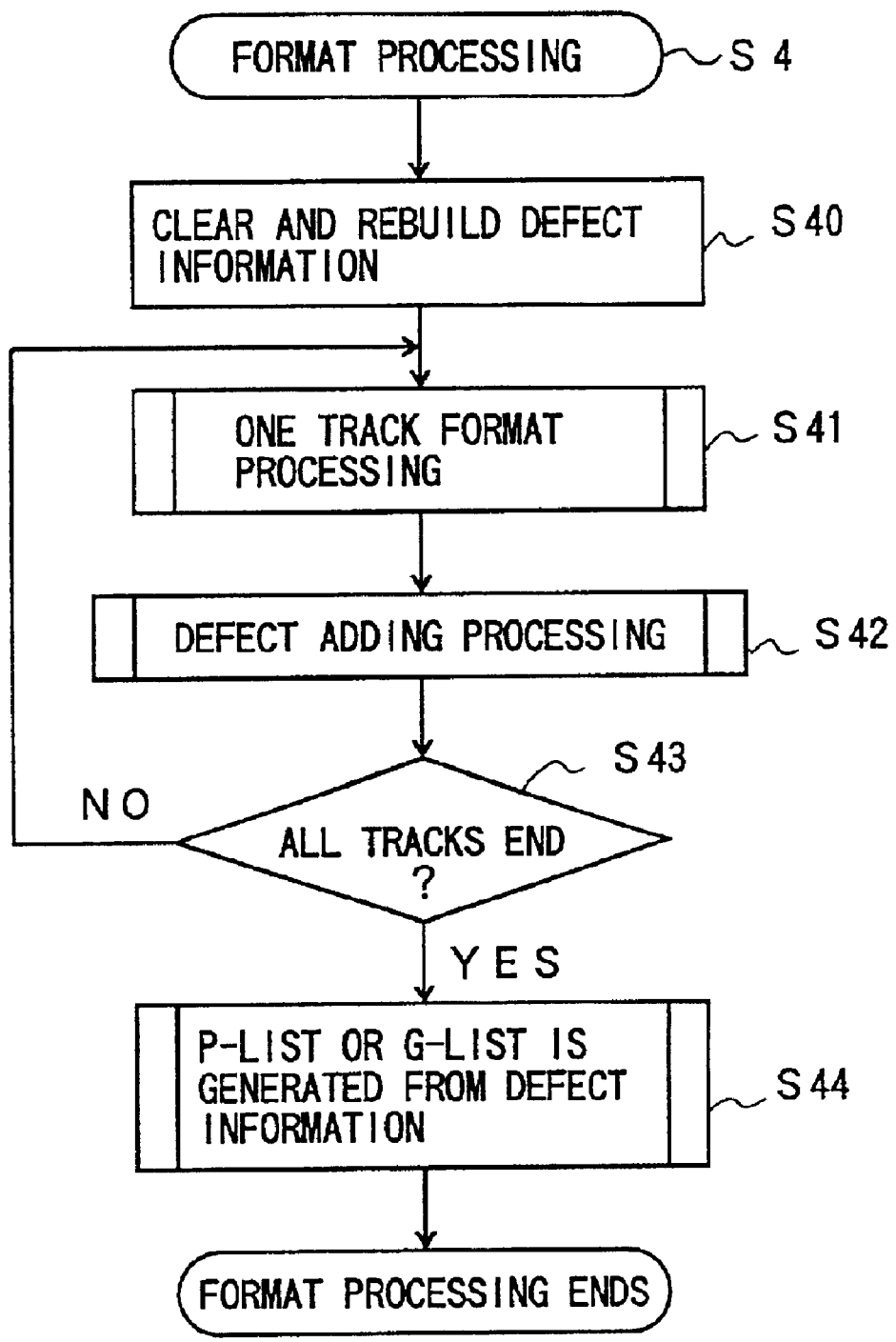
FIG. 6 is a flowchart showing format processing in step S4 according to the embodiment of the present invention.

FIG. 6 is the flowchart according to the embodiment of the present invention. In FIG. 6, when defect information detected in pre-processing is stored in the buffer memory 14, the defect information is then stored in the flash ROM 11. For this, the defect information in the buffer memory 14 is cleared and the defect information is rebuilt in the flash ROM 11 in step S40. Next, in step S41, one track format processing is performed on each track. The format processing in step S41 will be described with a flowchart.

Figure 7:
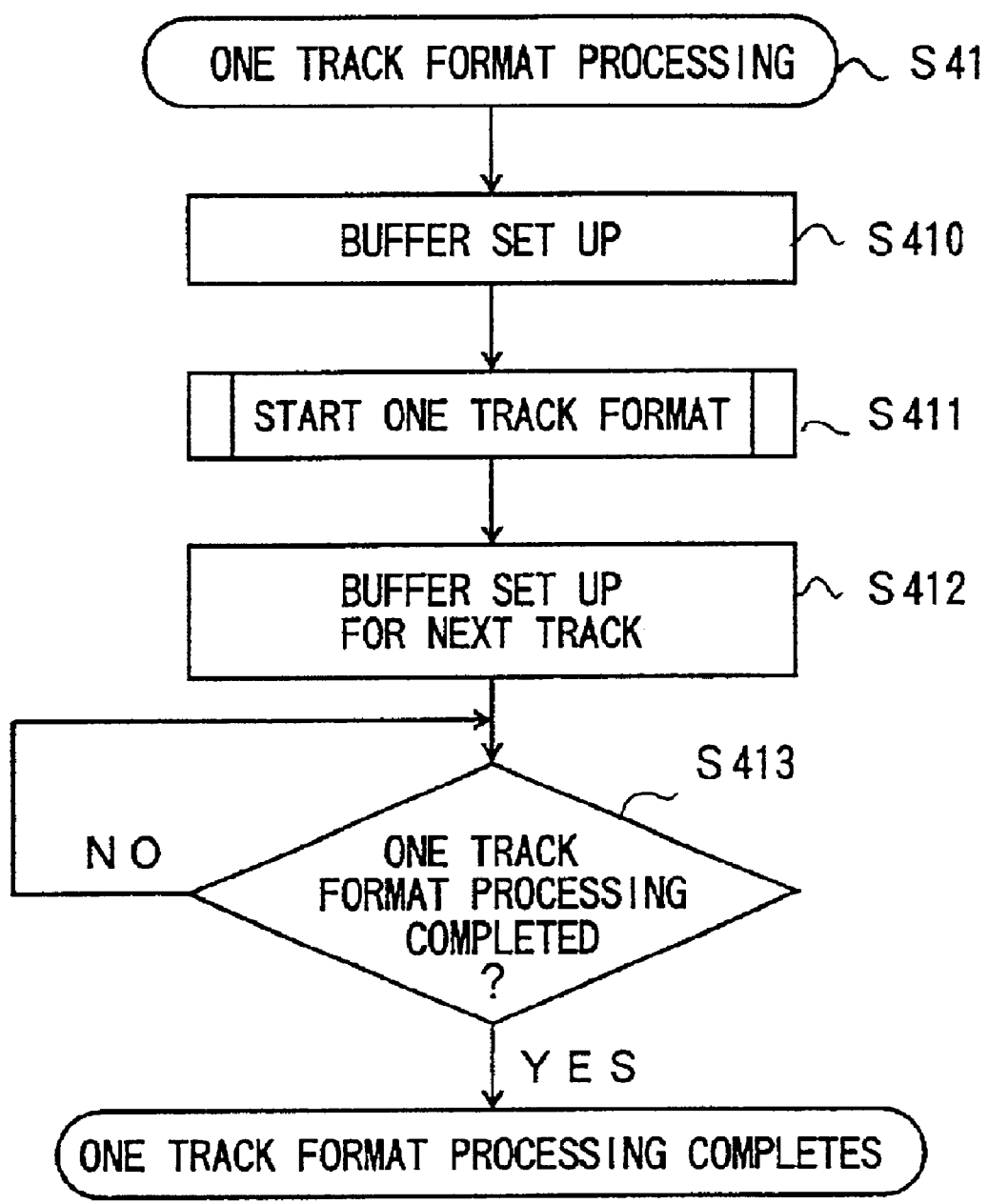
FIG. 7 is a flowchart showing one track format processing in step S41 according to the embodiment of the present invention.

FIG. 7 is the flowchart. In FIG. 7, data for formatting one track is set in the buffer memory 14 from the flash ROM 11 in step S410. When data is set in the buffer memory 14 in step S410, format processing for one track is started in step S411. After that, data necessary for formatting the next track is set in the buffer memory 14 in step S412. Then, one track format processing is performed while following the track according to the servo information until one track format processing for the track ends in step S413.

When an error in the servo information is detected during one track format in step S41, interrupt processing is performed. The interrupt processing will be described with a flowchart.

Figure 8:
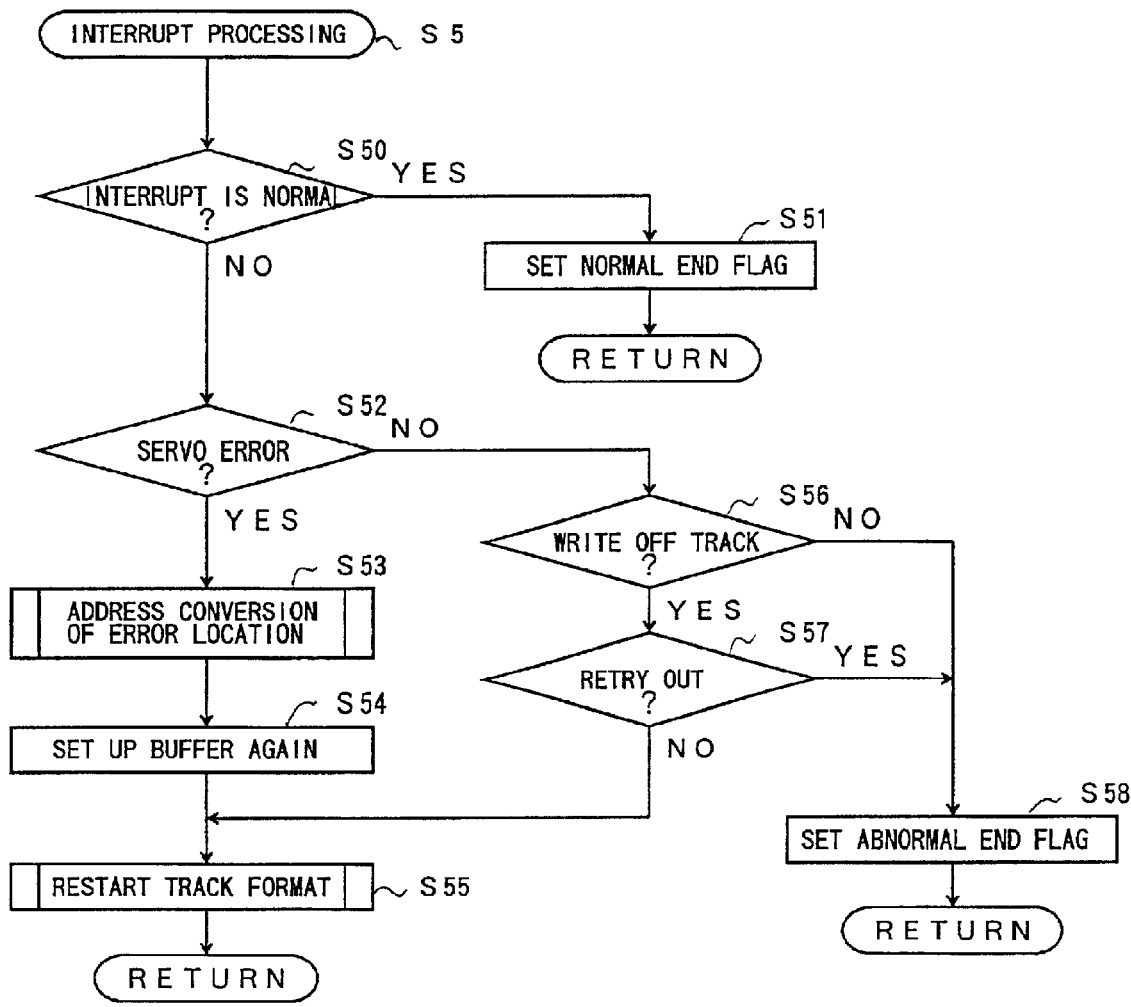
FIG. 8 is a flowchart showing interrupt processing in step S5 according to the embodiment of the present invention.

FIG. 8 shows the flowchart according to an embodiment of the present invention. In FIG. 8, it is determined whether the interrupt processing is normal in step S50. When it is normal, a flag which indicates normal end is set in step S51. After that, format processing is resumed.

When it is determined that the interrupt processing is not normal, it is determined whether the processing is a servo error in step S52. When it is determined that the processing is not the servo error, the information is checked whether it can be read or not in step S56 and step S57. When the processing is determined to be abnormal, a flag indicating abnormal end is set in step S58.

When the interrupt processing is determined to be the servo error, the address information of the defect information is stored in a defect map in the buffer memory 14 in step S53. After the processing of step S53, the format processing procedure is set in the buffer memory 14 again in step S54. The track format is restarted in step S55.

By storing the defect information, format processing or the like can be continued by skipping the defect part.

In step S42 in FIG. 6, the defect information stored during one track format processing in step S41 is added wherein the information is categorized according to the circumstances of processing. The defect adding processing will be described with a flowchart.

Figure 9:
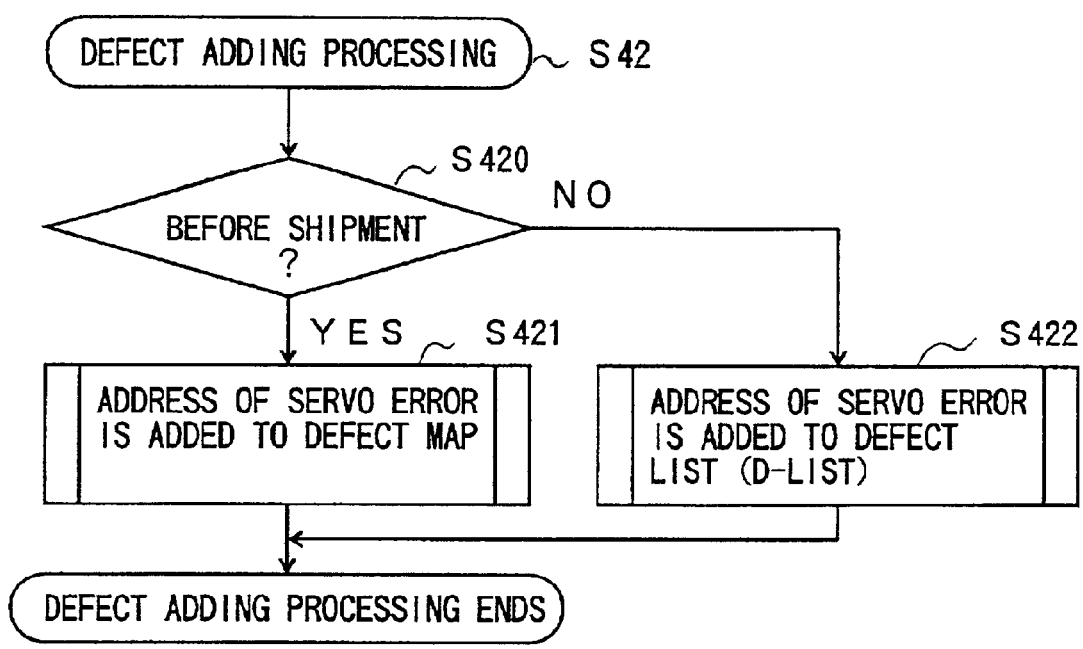
FIG. 9 is a flowchart showing defect adding processing step S42 according to the embodiment of the present invention.

FIG. 9 shows the flowchart showing the defect adding processing according to the embodiment of the present invention. In FIG. 9, after the one track format processing ends, it is determined whether the situation of the processing is before shipment or not in step S420. When it is before shipment, the address of the servo error is added to the defect map in step S421. When it is after shipment, the address of the servo error is added to a defect list other than the defect map in step S422. In this way, the defect adding processing is performed by discriminating between before and after shipment. By storing defect information before or after shipment, when storing information in the recording area, the information can be stored to allow skipping the defect part using the stored defect information. The defect map in which the address is stored will be described with a figure.

FIG. 10 shows the defect map according to an embodiment of the present invention. As shown in FIG. 10, the defect map stores the defect information in the servo information. The defect information includes "CYLINDER" (Cyl), "HEAD" (H), "BYTE POSITION FROM INDEX" (P) and "LENGTH OF DEFECT" (L). FIG. 10 shows a case in which 1-n sets of defect information exist. The "CYLINDER" (Cyl) indicates the position of the cylinder of the magnetic disk and the "HEAD" (H) indicates the position of the head. The "BYTE POSITION FROM INDEX" indicates the number of bytes between the position of the defect information and the index. The index means servo information that is the reference position for the magnetic head to follow the track. The "LENGTH OF DEFECT" is the length between the address A (shown in FIG. 12) which immediately follows the defect information and the address B which is just before the next servo information. The position of the defect information on the magnetic disk 2 is indicated by these four information items.

The one track format processing in step S41 and the defect adding processing in step S42 are repeated until all tracks are processed in step S43.

Next, in FIG. 6, the added defect information which is stored in the buffer memory 14 is converted so as to optimize the information amount by the MCU 10. Then, the defect information is stored in a primary list (P-LIST) or a grown list (G-LIST) in step S44. Then, a defect management table is generated. The primary list is generated before shipment and the grown list is generated after shipment.

The primary list or the grown list will be described with a figure.

FIG. 11 shows the primary list or the grown list according to the embodiment of the present invention. As shown in FIG. 11, the defect information includes "CYLINDER" (Cyl), "HEAD" (H) and "SECTOR NUMBER" (S). FIG. 11 shows 1-n sets of defect information corresponding to those shown in FIG. 10. In "CYLINDER", the position information of the cylinder in which the defect information exists is stored. In "HEAD", the position information of the magnetic head 4 is stored. In "SECTOR NUMBER", a sector address which is converted from the byte position from index and the length of defect is stored.

As mentioned above, the format processing is performed according to the steps S40–S44. Next, a track format in the format processing will be described with a figure.

Figure 12:
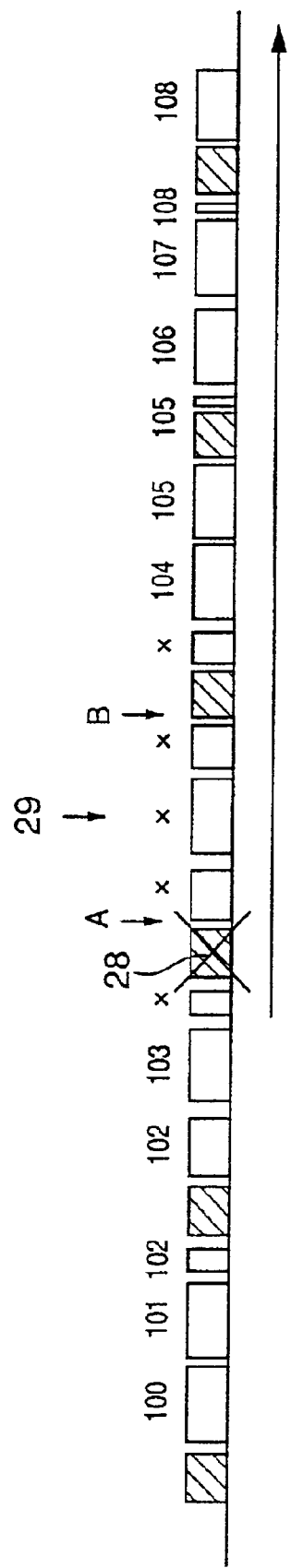
FIG. 12 shows a track format at the time when a servo error is detected according to the embodiment of the present invention.

FIG. 12 shows the track format at the time when a servo error is detected according to an embodiment of the present invention.

As shown in FIG. 12, "28" indicates the servo error, "A" indicates the address right after the servo error 28 and "B" indicates the address just before the next servo information after "A". When the servo error 28 is detected at the time of the format processing, the MCU 10 performs slip processing for sectors located from the address A which is next to the address 103 to the address B and the sectors are replaced. Then, the format processing is continued from the next address 104.

In the above-mentioned embodiment, the process in step S4 shown in FIG. 5 corresponds to the recording area setting step. The process in step S5 shown in FIG. 8 corresponds to the error detecting step. In addition, the process performed by the control part includes the steps S53–S55. The process performed by the defect information management part includes the step 42 in FIG. 6.

As mentioned above, according to the present invention, when an error of track following information (servo information) is detected, the defect information is controlled such that the recording area between the error and the next track following information (next servo information) is skipped. As a result, the format processing can be continued and the drive becomes accessible. Thus, an unusable state can be avoided and it becomes unnecessary to restart format processing when the error is detected. Therefore, the format processing becomes effective. In addition, the storing medium which can not be used by the conventional technique can be used effectively according to the present invention.

The present invention is not limited to the specifically disclosed embodiments, and variations and modifications may be made without departing from the scope of the invention.

What is claimed is:

1. An information storage device which stores information in recording areas generated by dividing a track, wherein track following information is configured such that a head follows the track according to the track following information, said information storage device comprising:

a recording area setting part which divides a storage medium into predetermined recording areas;

an error detecting part which detects an error in said track following information; and a control part which controls said information storage device, wherein, when said error detecting part detects an error in said track following information while setting recording areas by said recording area setting part, interrupt processing is performed in which recording areas spanning from a recording area including said track following information having said error to a recording area including next track following information are replaced by other recording areas by performing a slipping process and recording area setting is restarted, wherein said slipping process continues sequentially through the last track in the information storage device.

2. The information storage device as claimed in claim 1, further comprising a defect information management part;

wherein, when said error detecting part detects an error in said track following information while setting recording areas by said recording area setting part, said defect information management part stores position information of recording areas spanning from a recording area including said track following information having said error to a recording area including next track following information as defect information.

3. The information storage device as claimed in claim 2, wherein said defect information is detected before shipment and is stored as first defect information management information.

4. The information storage device as claimed in claim 2, wherein said defect information is detected after shipment and is stored as second defect information management information.

5. The information storage device as claimed in claim 2, wherein, when said defect information is detected before shipment, said defect information is stored as first defect information management information; and when said defect information is detected after shipment, said defect information is stored as second defect information management information.

6. The information storage device as claimed in claim 1, wherein said interrupt processing determines whether said interrupt processing is normal, and if so, setting recording areas continues, otherwise a determination of whether the interrupt processing is a track following information error occurs, and if so, defect information is stored in a defect map in a buffer memory, and a recording area setting procedure is set in said buffer memory.

7. A defect information management method in an information storage device which stores information in recording areas generated by dividing a track, wherein track following information is configured such that a head follows the track according to the track following information, said defect information management method comprising:

a recording area setting step for dividing a storage medium into predetermined recording areas;

an error detecting step for detecting an error in said track following information; and a control step for controlling said information storage device, wherein, when an error is detected in said track following information while setting recording areas in said recording area setting step, interrupt processing is performed in which recording areas spanning from a recording area including said track following information having said error to a recording area including next track following information are replaced by other recording areas by performing a slipping process and recording area setting is restarted, wherein said slipping process continues sequentially through the last track in the information storage device.

8. The defect information management method as claimed in claim 7, wherein, when an error is detected in said track following information while setting recording areas in said recording area setting step, position information of recording areas is stored as defect information, said recording areas spanning from a recording area including said track following information having said error to a recording area including next track following information.

9. The defect information management method as claimed in claim 8, wherein said defect information is detected before shipment and is stored as first defect information management information.

10. The defect information management method as claimed in claim 8, wherein said defect information is detected after shipment and is stored as second defect information management information.

11. The defect information management method as claimed in claim 8, wherein, when said defect information is detected before shipment, said defect information is stored as first defect information management information; and when said defect information is detected after shipment, said defect information is stored as second defect information management information.

12. The defect information manage ment method as claimed in claim 7, wherein said interrupt processing includes the steps of determining whether said interrupt processing is normal, and if so, continuing to set recording areas, otherwise determining whether said interrupt processing is a track following information error, and if so, storing defect information in a defect map in a buffer memory, and setting a recording area setting procedure in said buffer memory.

* * * * *